March 3, 1970   F. TEMPLE ET AL   3,498,585

BALL VALVE

Filed Dec. 20, 1966   2 Sheets-Sheet 1

INVENTOR.
FRED TEMPLE
WALTER B. KIRK
BY
AGENT

March 3, 1970  F. TEMPLE ET AL  3,498,585
BALL VALVE

Filed Dec. 20, 1966  2 Sheets-Sheet 2

INVENTOR.
FRED TEMPLE
WALTER B. KIRK
BY Donald P. Roovey
AGENT

United States Patent Office 3,498,585
Patented Mar. 3, 1970

3,498,585
BALL VALVE
Fred Temple, Pittsburgh, and Walter B. Kirk, Pitcairn, Pa., assignors to Westinghouse Air Brake Company, Wilmerding, Pa., a corporation of Pennsylvania
Filed Dec. 20, 1966, Ser. No. 603,186
Int. Cl. F16k 5/06, 25/00
U.S. Cl. 251—315     4 Claims

ABSTRACT OF THE DISCLOSURE

A ball valve having a rotatable ball valve element seated between two diametrally related seat members conforming in outer contour to a conical valve chamber in the valve body. An operating stem is separably interlocked with a conforming recess in the ball valve element on installation of the valve stem for rotation of the valve element. Projections on the seat members interlock with the valve body to prevent rotational movement of the seat members within the conical valve chamber. Separation of the ball valve element from the valve stem due to wear of the seat members is prevented by stop means on the valve body normally disengaged from the ball valve element.

Background of the invention

Ball valves in the past have proven reliable and given satisfactory service life; however, recently the need for a ball valve that offers the convenience of total or partial replacement of the seat seals in combination with ease of removability of the seat seals coupled with maximum sealing capacity, ease of operation, low cost and simplicity of maintenance has become more apparent in the art.

Summary of the invention

According to the invention there is provided a housing in which a ball is disposed in sealing relationship between a pair of oppositely disposed seat seals in a frusto-conical central space in the housing for controlling the flow of fluid through a pair of longitudinally aligned end passages of the housing that open into the central space at positions diametrically opposed to each other. The seat seals are identical and each has an inner flat face and an outer conically shaped face which is adapted to fit in sealing relation with the inside wall of the said frusto-conical central space. The outer conical face of each seal converges toward the inner flat face at one end of the seal. The ball and each of the seat seals have a bore therethrough which through bores are longitudinally aligned with each other and with the end passages of the housing to form a common flow passage through the housing and the ball valve. The ball per se is adapted to be turned, by a removable valve operating stem, to a position in which the bore in the ball is perpendicular to the flow passage between the end passages and the seat seals thus sealing off all fluid communication between the said end passages.

Figure 1:
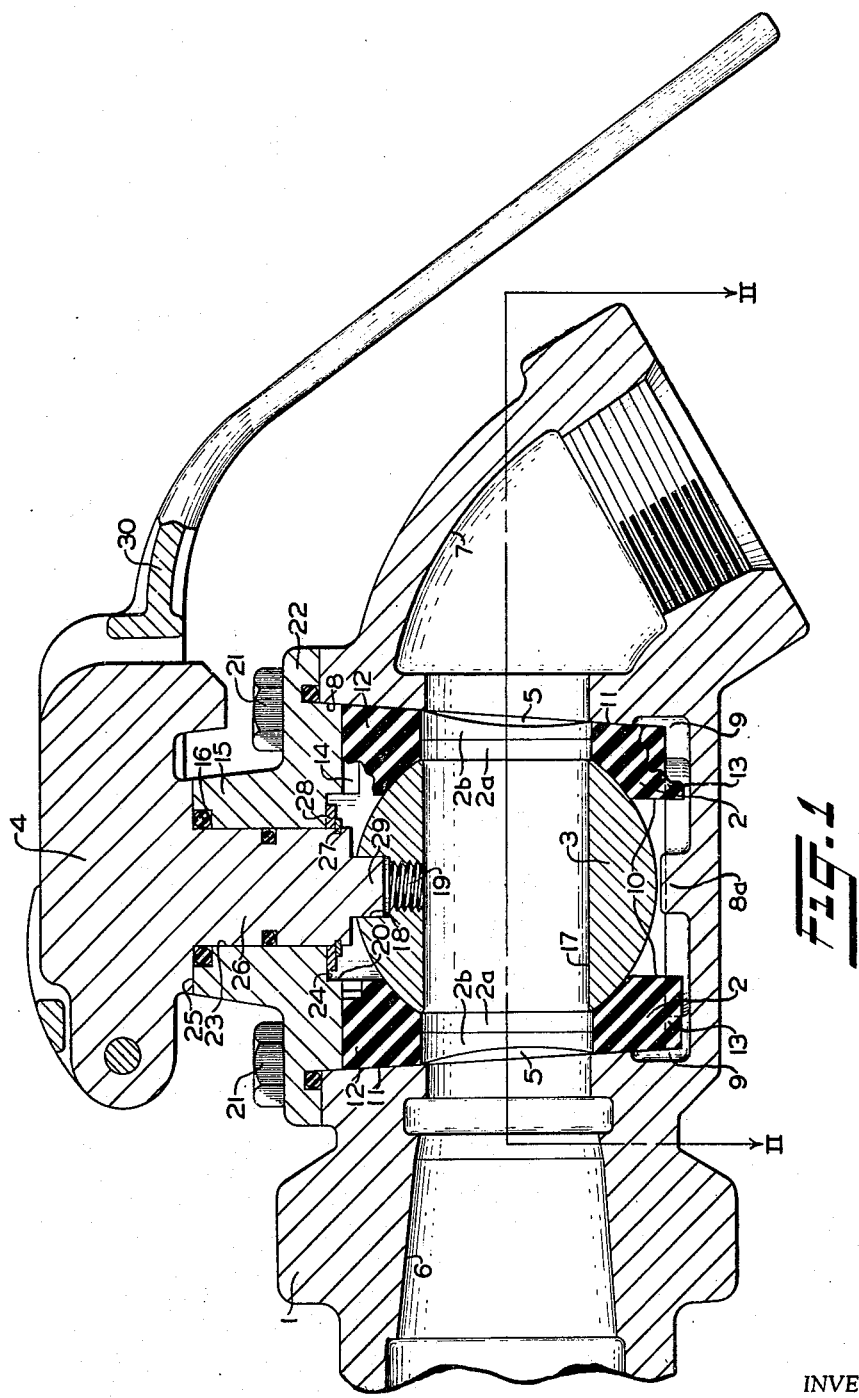
FIG. 1 is a longitudinal cross-sectional view of the cock, showing the ball valve in full open position.
Figure 2:
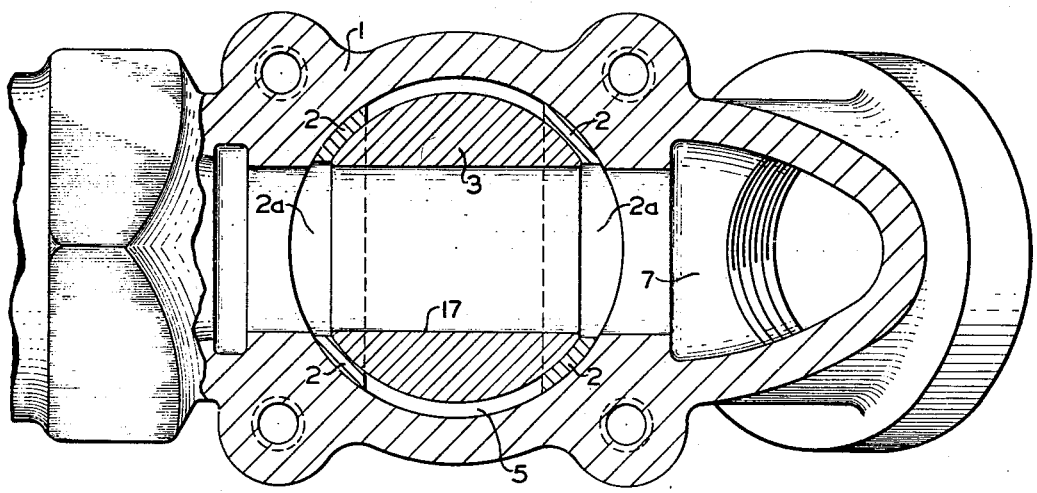
FIG. 2 is a view, in cross section, taken along the lines II—II of FIG. 1.

Referring now to the drawings, the disclosed angle cock comprises a housing 1, seat seals 2 within said housing, a ball type valve means 3 mounted for rotation within said seat seals, and a valve operator stem 4 adapted to cooperate with said ball. The housing 1 comprises a body having a generally frusto-conical shaped central space 5 therein and a pair of longitudinally aligned end passages 6 and 7 each communicating with said central space 5 and the exterior of said housing 1. The end passages are adapted to be connected, one each, to the brake pipe and to the hose and coupling assembly of a railroad car or they could connect the cock body to any suitable fluid system. The central space 5 diverges to a circular opening 8 in the top of said housing. Opposite the said circular opening 8 is a ball-supporting projection or shoulder 8a and two internal recessed portions 9 which are adapted to receive a bottom portion of the said seat seals 2 for purposes hereinafter described.

Two identical seat seals 2, having a tapered configuration as hereinafter described, are fitted within the central space 5. The seat seals are preferably molded of suitable plastic or rubber composition. Each seat seal has a generally central bore 2a which provides communication between said end passages 6 and 7 and said central space 5 in that the bores are aligned with the said end passages when the said seat seals are fitted within said central space 5 and said recessed portions 9. Each bore 2a has a flared end 2b adapted to fit in sealing relation with the ball 3. Each seat seal 2 further includes an inside flat face 10 which, when the seat seals are fitted in place in the central space 5 and the recessed portions 9, as shown in FIG. 1, assumes a vertical position and is disposed in parallel relationship with the flat face of the other seat seal to thus provide a cooperation between the seat seals to more effectively hold the ball in operating position and provide a more positive seal between the seat seals and the ball. The outerface 11 of each seat seal, however, is conically shaped so as to fit the frusto-conical curved wall of the central space 5 to provide for maximum sealing effectiveness within the central space per se.

Accordingly, when maintaining the flat face 10 of the seat seals 2 in a vertical position, that is, parallel to the axis of the frusto-conical central space, it should be noted that the outer face of the seat seals are curved to provide effective sealing. The arcuate back face 11 of each seat seal curves to intersect the front face at a pair of opposing edges which converge at a constant rate from one end of the seat seal to the other end, as shown in FIG. 4, and the back 11 of the seat seal converges at the same time toward the front face 10 at the said other end of the seat seal, as best seen in FIG. 1.

From the foregoing description of the seat seal configuration, it is observed that upon insertion of the seat seals 2, with the ball 3 disposed therebetween, into the frusto-conical space 5, the respective backs 11 of the seat seals comprise opposing segments of a common frusto-conical figure having a configuration congruent with the wall of the frusto-conical space.

Figure 3:
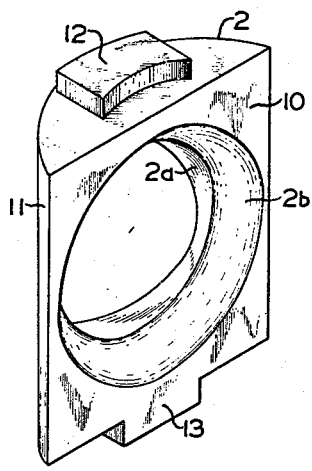
FIG. 3 is an isometric view of either one of the identical seat seals of FIG. 1.
Figure 4:
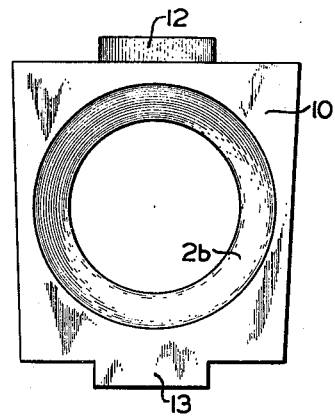
FIG. 4 is a front view of the seat seal of FIG. 3.

At the top of each seat seal, as best seen in FIGS. 3 and 4, is an upwardly extending shoulder 12. At the bottom of each seat seal is a downwardly extending shoulder 13. The shoulders 12 fit into a registering recessed portion 14 in a cover bonnet 15 which will be more fully described hereafter. As shown in FIG. 1, the shoulders 13 fit into the said recessed portions 9 registering engagement therewith. The purpose of the shoulders and the recesses registering with each other is so the seat seals do not turn with the ball 3 when the ball is turned by rotation of the valve operator 4.

As before mentioned, fitted for rotation between the seat seals 2 is the ball 3 having a bore 17 alignable with the seat seal bores 2a and the longitudinally aligned end passages 6 and 7. Perpendicular to the axis of said bore 17 on top of the ball is a slot 18. At the bottom of the slot 18 is a threaded bore 19 which is also perpendicular to the axis of bore 17. When bonnet 15 is removed a suitable stud, not shown, is adapted to be screwed into the threaded through bore 19 and lifted vertically when it is desired to remove the ball 3 or the seat seals 2 or both from the cock body for repair or replacement.

Abutting the top of the seat seals and the shoulders 12 thereon and compressing them tightly within the central space 5 are the bottom of the recesses 14 and downwardly extending bosses 20 which are integral with the bottom of the aforementioned bonnet 15, the bonnet being attached to the houing as by bolts 21. A conventional O-ring seal is seated in a groove in a shoulder 22 of the bonnet 15 sealing the mating surfaces of the housing 1 and the bonnet 15. The bonnet 15 further includes a central through bore 23 and a downwardly facing counterbore 24 at the bottom of the bonnet surrounding the through bore 23. On the top 25 of the bonnet 15 is another counterbore 16, which is adapted to receive an O-ring to create a sealed condition between the bonnet 15 and the stem 4 which has a neck portion 26 that projects downwardly through the bore 23 of the bonnet 15.

About half way down the neck portion 26 of stem 4 is a peripheral circumferential groove having a conventional sealing O-ring therein. Also around the periphery of the neck 26, near the bottom, is a circumferential recess having a snap ring 27 therein. The snap ring frictionally rides on a washer bearing 28 which is fitted in the counterbore 24 of the bonnet 15 permitting smooth stem rotation and at the same time holding the stem 4 within the bore 23 of bonnet 15. At the bottom of the neck portion 26 is a key 29 which is integral with the neck and projects downward into the slot 18 of ball 3 to facilitate turning of the ball 3 by rotation of stem 4. A small clearance space is left between the bottom of the slot 18 and the end of the key 29 to compensate for any temperature changes or tolerances. The top portion of stem 4 is adapted to be fastened to handle 30 which in turn is adapted to be turned manually and thus rotate stem 4, key 29 and ball 3.

From the foregoing description, the operation of applicants' novel ball and seat seal arrangement is obvious to one of ordinary skill in the art. However, it should be noted that if anyone were to stand on handle 30 or stem 4 or exert any downward force on the handle or the stem, this force would not be transmitted in any way to the seat seals 2 or the ball 3 since all such forces would be communicated first to the bonnet 15 at its top portion 25 and then further transmitted through the bonnet 15 to the shoulders 22 and then directly to the housing 1. It should also be noted that if the seat seals are severely worn or melted and the ball drops and rests on projection 8a, the slot 18 of the ball will still register with key 29 of stem 4 and the ball cannot then rotate due to vibration and accidently seal off communication between the end passages 6 and 7.

Having now described the invention, what we claim to be new and desire to secure by Letters Patent is:

1. A ball valve device comprising:
    (a) a housing having a frusto-conical central space therein diverging to a circular opening in one side of the said housing and a pair of generally cylindrical longitudinally aligned end passages each communicating with said central space and the exterior of said housing, the axis of the end passages being transverse to the axis of said frusto-conical central space,
    (b) a pair of seat seals disposed in opposing relationship in the central space, said seat seals each having a flat face and an arcuate back which has a curvature corresponding to that of the wall of said central space and converging toward said flat face at one end thereof so that with said seals disposed in said central space with their backs sealingly engaging said wall the said flat faces are substantially parallel to each other and the axis of the central space,
    (c) each of said seat seals having a through bore registering at their respective backs with one of said end passages and including a flared counterbore at each of said flat faces shaped to provide a spherical seat in the flat face of each seat seal,
    (d) a ball valve element having a bore therethrough and positioned between said seat seals in sealing relationship on each said spherical seat, said ball valve element being so disposed as to provide communication between said end passages in one rotational position of said ball valve element and adapted to prevent communication between said end passages in another rotational position of said ball valve element,
    (e) a bonnet attached to said housing, and
    (f) a rotary valve stem journaled in said bonnet and separably connected to said ball valve element for effecting rotary movement thereof.

2. The ball valve device of claim 1, wherein interlocking means on said seat seals, said bonnet and said housing prevent rotational movement of said seat seals within said central space when the said ball valve element is rotated.

3. The ball valve device of claim 1 wherein said seat seals further comprise upper and lower projections which interlock respectively with recessed portions in said bonnet means and said housing for the prevention of rotational movement of said seat seals within said central space when the said ball valve element is rotated.

4. A ball valve device as claimed in claim 1, wherein the said ball valve element is provided with a recess into which the inner end of the rotary valve stem interlockingly and slidably projects, and further characterized by a projection on the valve body having a normal clearance with said ball valve element and engageable by the ball valve element prior to disengagement of said stem from the ball valve element as wear of the seat members occurs.

References Cited

UNITED STATES PATENTS

| | | | |
|---|---|---|---|
| 3,042,066 | 7/1962 | Wolfensperger | 251—315 XR |
| 3,132,836 | 5/1964 | Dickerson et al. | 251—315 XR |
| 3,173,648 | 3/1965 | McGuire et al. | 251—315 XR |
| 3,339,884 | 9/1967 | Smith et al. | 251—315 XR |
| 3,081,792 | 3/1963 | Hansen | 137—454.2 |
| 3,168,900 | 2/1965 | Hansen et al. | 251—317 XR |

HENRY T. KLINKSIEK, Primary Examiner